United States Patent [19]
Fan

[11] Patent Number: 5,337,308
[45] Date of Patent: Aug. 9, 1994

[54] LOW DELAY ATM SWITCHING SYSTEM USING IDLE CELLS STAMPED WITH REFERENCE TIME

[75] Inventor: Ruixue Fan, Tokyo, Japan

[73] Assignee: NEC Corporation, Tokyo, Japan

[21] Appl. No.: 9,941

[22] Filed: Jan. 27, 1993

[30] Foreign Application Priority Data

Jan. 27, 1992 [JP] Japan ................. 4-011544

[51] Int. Cl.$^5$ ............................................ H04Q 11/04
[52] U.S. Cl. ............................................ 370/60
[58] Field of Search .................. 370/94.1, 60, 60.1, 370/94.2, 58.1, 58.2, 58.3, 54

[56] References Cited

U.S. PATENT DOCUMENTS

| | | | |
|---|---|---|---|
| 4,661,947 | 4/1987 | Lea et al. ............... | 370/60 |
| 4,858,232 | 8/1989 | Diaz et al. ............. | 370/60 |
| 4,894,823 | 1/1990 | Adelmann et al. ..... | 370/60 |
| 5,086,428 | 2/1992 | Perlman et al. ........ | 370/60 |

OTHER PUBLICATIONS

H. Obara, "Design of a Multi-Stage Self-Routing Switch with a Distributed Cell Sequence Control", Institute of Electronics, Information & Communications Engineers of Japan, J72-B-1, No. 9, pp. 698-709.

Primary Examiner—Douglas W. Olms
Assistant Examiner—Ajit Patel
Attorney, Agent, or Firm—Sughrue, Mion, Zinn, Macpeak & Seas

[57] ABSTRACT

In a multi-stage switching system, a time stamp is attached to each cell at an entry point of the system indicating the time of arrival of the cell, and the cell is transferred to a network comprising multiple switching stages each being composed of basic switching modules. The switching modules of all stages are interconnected to form the network. Each switching module comprises a self-routing switch and buffers connected thereto. The time stamp of cells arriving at a given one of the switching modules, where the cells are likely to arrive out of sequence, is constantly monitored and a minimum value of the time stamps is detected. When an empty buffer exists in the given switching module, an idle cell containing the time stamp of the minimum value is generated at the output of the empty buffer.

2 Claims, 8 Drawing Sheets

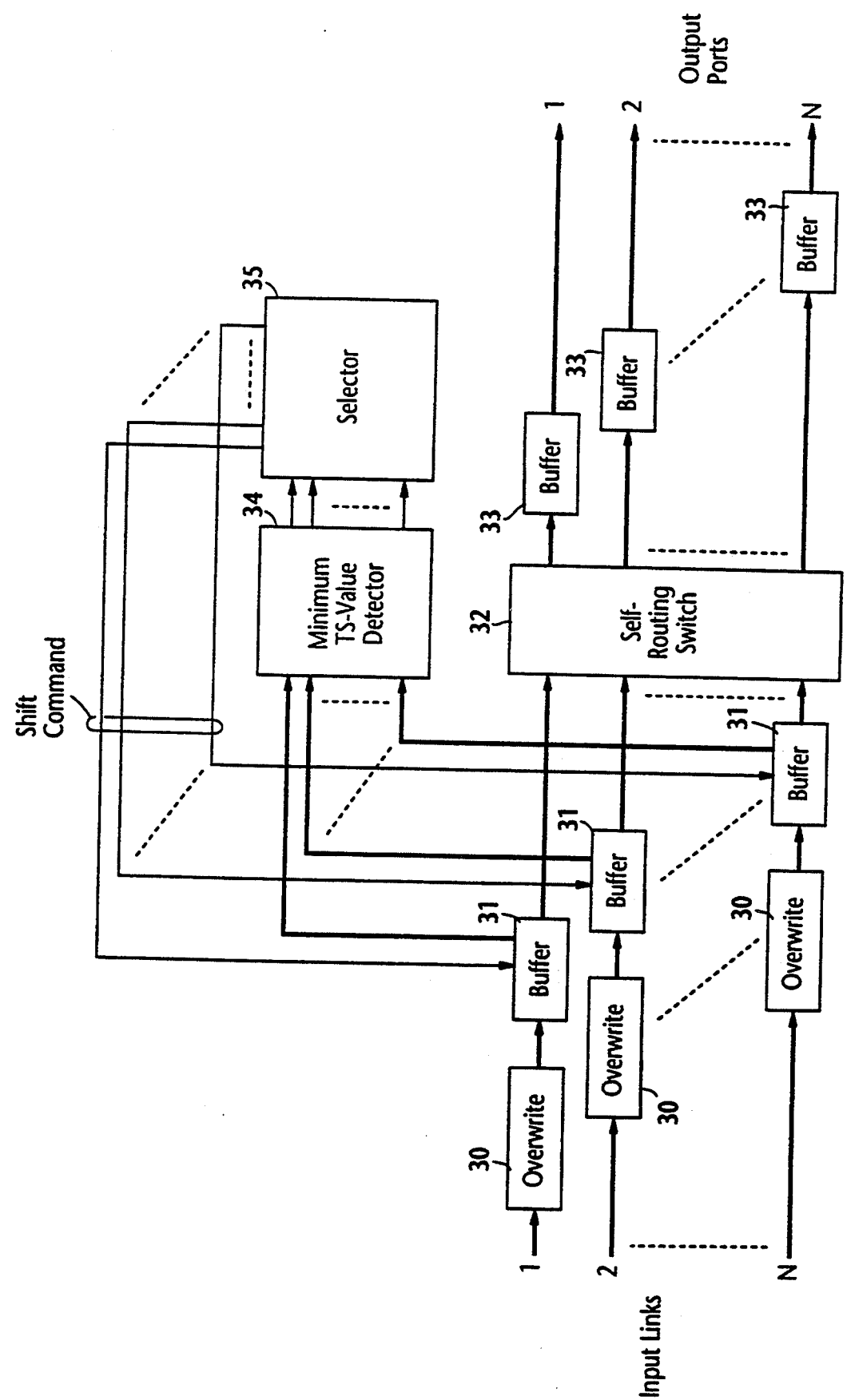

LOW DELAY ATM SWITCHING SYSTEM USING IDLE CELLS STAMPED WITH REFERENCE TIME

BACKGROUND OF THE INVENTION

1. Field of the Invention

The present invention relates generally to switching systems, and more specifically to an asynchronous transfer mode multi-stage switching system with each stage being composed of basic switching blocks or modules.

2. Description of the Related Art

Self-routing switching systems have been proposed for switching high-speed asynchronous transfer mode (ATM) cells according to the destination address contained in their cell headers. Since cells of a given connection may take different routes of the system before arriving at the same destination depending on the traffic pattern, it is important to maintain cell sequence integrity for all cells of the connection. This is achieved by putting cells in a queue and waiting for an earlier cell when they arrive out of sequence. However, a total delay time of a cell transferred through the switching system would become substantial if out-of-sequence conditions occur in successive stages of the system.

To achieve low cell transfer delay a cell sequence control technique is described in an article "Design of a Multi-Stage Self-Routing Switch with a Distributed Cell Sequence Control", Hitoshi Obara, Japanese-language technical journal B-1, J72-B-1, No. 9, pages 698 to 709, the Institute of Electronics, Information and Communications Engineers of Japan. According to this known technique, a time stamp is attached to each incoming cell as it arrives at an entry point of a switching system and distributed evenly across the input links of a multi-stage self-routing network. When no cell exists at an entry point of the system, an idle cell containing a time stamp only is generated at that point and transferred to the self-routing network. Each stage of the system is composed of basic switching modules each consisting of N self-routing switches of $(1 \times N)$ configuration and N groups of N first-in-first-out buffers, with the FIFO buffers being connected to respective outlets of the self-routing switches. N sequencers are associated with respective groups of the buffers to deliver cells to an output link of the switching module according to their time stamp values. When each self-routing switch receives an idle cell, it broadcasts its copies to all buffers.

However, buffer empty probability still exists in a switching module and this probability increases with the size of the switching module as well as with a biased traffic pattern of cells even if their arrival rates are uniform across all entry points of the system. Thus, the delay time reduction effect of the prior art switching system is degraded.

SUMMARY OF THE INVENTION

It is therefore an object of the present invention to provide a multi-stage switching system using novel cell sequence control that ensures delay time reduction while maintaining cell sequence integrity.

This object is obtained by constantly monitoring the time stamp values of cells which may arrive out of sequence at a given switching module, detecting a minimum time stamp value, and generating an idle cell containing the minimum time stamp value at an output link of the given switching module to which output link an empty buffer is connected. Empty buffer probability is reduced significantly with a resultant reduction of the average cell waiting time and hence the total system delay time.

According to a first broader aspect of the present invention, a multi-stage switching system comprises a pre-switching stage connected to input ports of the system for receiving incoming cells therefrom, attaching a time stamp to each of the cell indicating the time of arrival of the cell at the input ports of the system, and transferring the cell to one of its output terminals, and a plurality of switching stages each comprising switching modules, the switching modules of each stage being interconnected with those of the other stages. Each switching module of each stage comprises a self-routing switch and a plurality of buffers connected to the self-routing switch for receiving cells from the switch and delivering the cells to output links of the switching module. According to the first aspect of the invention, the time stamp of cells arriving at a given one of the switching modules, where the cells are likely to arrive out of sequence, is monitored and a minimum value of the monitored time stamps is detected. An empty buffer is detected from the buffers of the given switching module and identified. An idle cell containing the time stamp of the minimum value is generated at the output of the identified buffer when such buffer empty condition occurs.

According to a second broader aspect of the present invention, a multi-stage switching system comprises a pre-switching stage connected to the input ports of the system for receiving incoming cells, attaching a time stamp to each of the cell indicating the time of arrival of the cell at the input ports, and transferring the cell to one of its output terminals, and a plurality of switching stages each comprising switching modules. The switching modules of all stages being interconnected to form a self-routing network. Each switching module of each stage comprises a plurality self-routing switches and a plurality of groups of buffers, the buffers of each group being connected to respective outputs of the self-routing switches for receiving cells therefrom, and a plurality of sequencers associated respectively with the buffers of a corresponding group, each of the sequencers delivering cells from the buffers of the corresponding group to an output link of the switching module. According to the second aspect of the present invention, the time stamp of cells arriving at a given one of the switching modules where the cells may arrive out of sequence is monitored and a minimum value of the monitored time stamps is detected. An idle cell containing the time stamp of the minimum value is generated and compared with each cell from each of the sequencers and one of the compared cells is delivered to an output link of the given switching module depending on the time stamps of the compared cells. The idle cell is also delivered to the output link when all the buffers of each group are empty.

According to a first specific aspect of the present invention, a multi-stage switching system comprises a pre-switching stage connected to input ports of the system for receiving incoming cells, attaching a time stamp to each of the cell indicating the time of arrival of the cell at the input ports, and transferring the cell to one of its output terminals. The system includes a first switching stage composed of switching modules each with input links connected to ones of the output terminals of the pre-switching stage. Each switching module of the first stage comprises a plurality of output buffers connected respectively to the output links of the switching module, a self-routing switch for routing a cell from any of the input links of the switching module to any one of the output buffers according to a destination address contained in the cell, and means for identifying an empty one of the output buffers, producing an idle cell having a time stamp indicating a current time, and supplying the idle cell to one of the output links corresponding to the identified output buffer. A second switching stage is also composed of switching modules each having input links connected to respective output links of the first stage. A third switching stage is likewise composed of switching modules each having input links connected to respective output links of the second stage, and output links connected to ones of output ports of the switching system. Each switching module of the second and third stages comprises a plurality of input buffers connected respectively to the input links of the switching module for storing cells from a preceding stage, a plurality of output buffers connected respectively to the output links of the switching module, a self-routing switch for routing a cell from any of the input buffers to any of the output buffers according to a destination address contained in the cell, and detector means connected to the input links of the switching module for sequentially detecting a cell having a minimum time stamp value and sequentially causing one of the input buffers to launch the detected cell into the self-routing switch. Each switching module of the second stage further comprises means for identifying an empty one of the output buffers of the switching module, producing an idle cell having the minimum time stamp value detected by the detector means of the switching module, and supplying the idle cell to one of the output links of the switching module corresponding to the identified output buffer.

According to a second specific aspect of the present invention, a multi-stage switching system which comprises a pre-switching stage connected to input ports of the system for receiving incoming cells, attaching a time stamp to each of the cell indicating the time of arrival of the cell at the input ports, and transferring the cell to one of its output terminals, a first switching stage comprising a plurality of switching modules each having a plurality of input links connected to ones of the output terminals of the pre-switching stage. Each switching module of the first stage comprises means for generating an idle cell containing a time stamp indicating a current time. A second switching stage comprises a plurality of switching modules each having input links connected to respective output links of the first stage. Each switching module of the second stage comprises means for detecting a cell having a minimum time stamp value and means for generating an idle cell containing the minimum time stamp. A third switching stage comprises switching modules each having input links connected to respective output links of the second stage and output links connected to ones of output ports of the switching system. Each switching module of all stages comprises self-routing switches corresponding respectively to the input links of the module. Each self-routing switch has an inlet connected to a corresponding input link of the switching module for routing a cell to any of outlets of the switch according to a destination address contained in the cell. Each switching module of the first and second stages comprises output circuits corresponding respectively to output links of the switching module. Each output circuit comprises buffers connected to respective outlets of the self-routing switches of the switching module, means for sequencing cells stored in the buffers according to the time stamps of the cells, and means for comparing a cell from the sequencing means and an idle cell from the idle cell generating means of the switching module and delivering one of the cells to the corresponding output link of the output circuit of the switching module depending on the time stamps of the cells. Each switching module of the third stage comprises output circuits corresponding respectively to the output links of the switching module. Each output circuit of this module includes buffers connected to respective outputs of the self-routing switches of the module and means for delivering cells stored in the buffers to the output link of the output circuit according to the time stamps of the cells.

BRIEF DESCRIPTION OF THE DRAWINGS

The present invention will be described in further detail with reference to the accompanying drawings, in which:

FIG. 4 is a block diagram of a switching module of the third stage of the system according to the first embodiment of the present invention;

DETAILED DESCRIPTION

Figure 1:
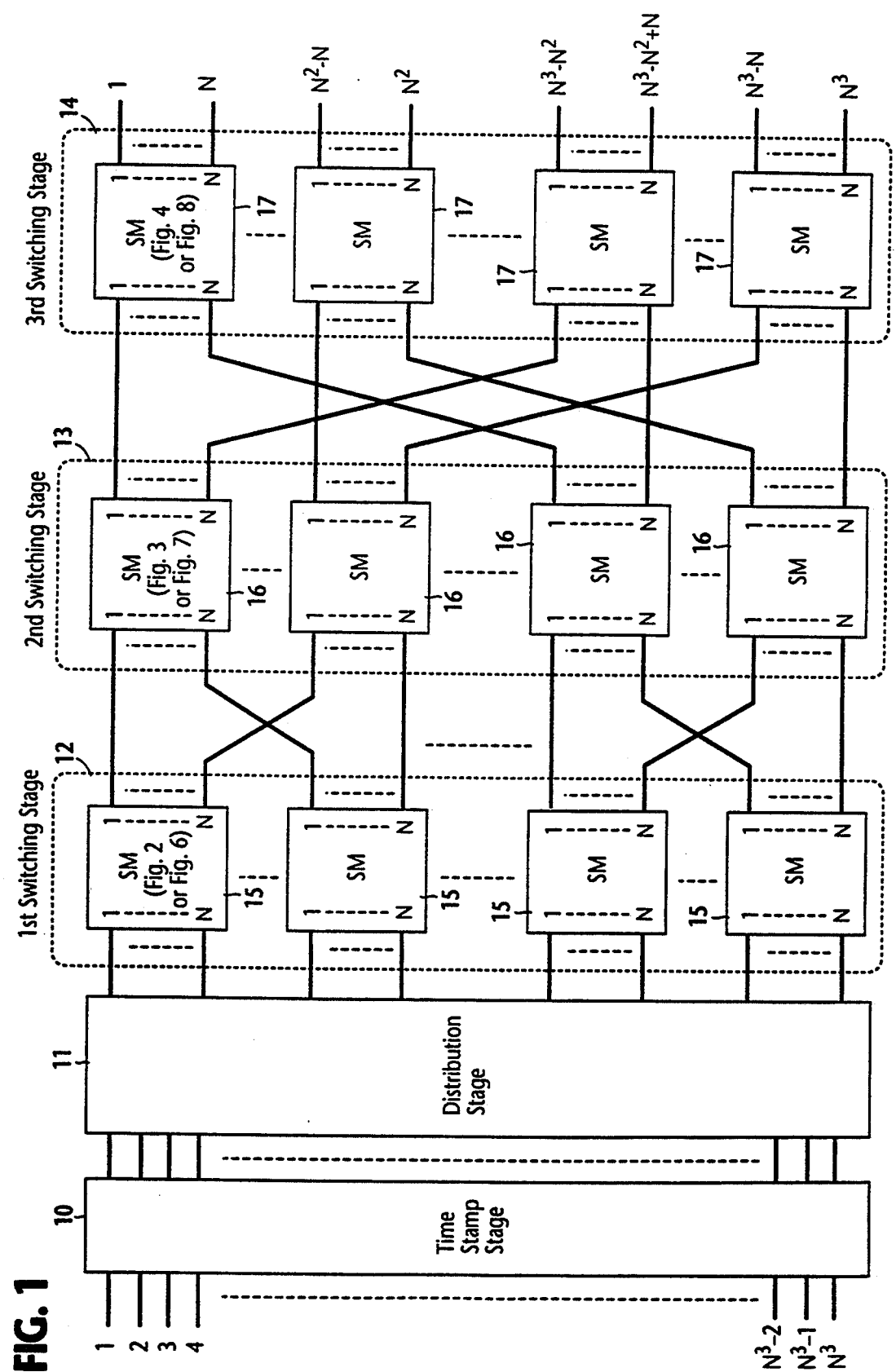
FIG. 1 is a block diagram of a multi-stage switching system embodying the present invention.

Referring now to FIG. 1, there is shown an $N^3 \times N^3$ self-routing multi-stage ATM (asynchronous transfer mode) switching system according to the present invention. The switching system comprises a time stamp stage 10, a cell distribution stage 11, a first switching stage 12, a second switching stage 13 and a third switching stage 14. The system has input ports which are numbered 1 through $N^3$ and connected to the inputs of time stamp stage 10, and output ports numbered 1 through $N^3$. Incoming packets, or ATM cells arriving at the input ports of the switching system are entered to the time stamp stage 10 where they are stamped in their cell headers with information indicating the time of arrival to establish cell sequence. The time-stamped cells are then distributed evenly by distribution stage 11 across the input links of the first switching stage 12 to avoid congestion of cells destined to particular routes.

The first switching stage 12 comprises N groups of identical $N \times N$ switching modules 15, and the second switching stage 13 likewise comprises N groups of N×N switching modules 16, the third stage 14 comprising N groups of N×N switching modules 17. The switching modules 15 of each group of the first stage 12 have their output links connected to respective input links of the switching modules of a corresponding group of the second stage 13 such that any input link of each first-stage switching module of each group has access to any output link of the corresponding group of the second stage 13. The output links of the second-stage switching modules 16 are connected to the input links of the third-stage switching modules 17 such that any inlet of each second-stage switching module has access to any output port of the third switching stage 14 which is also an output port of the switching system.

Switching modules of each stage are a basic switching block of self-routing capability for routing the time-stamped cells according to their destination addresses contained in their cell headers.

Figure 2:
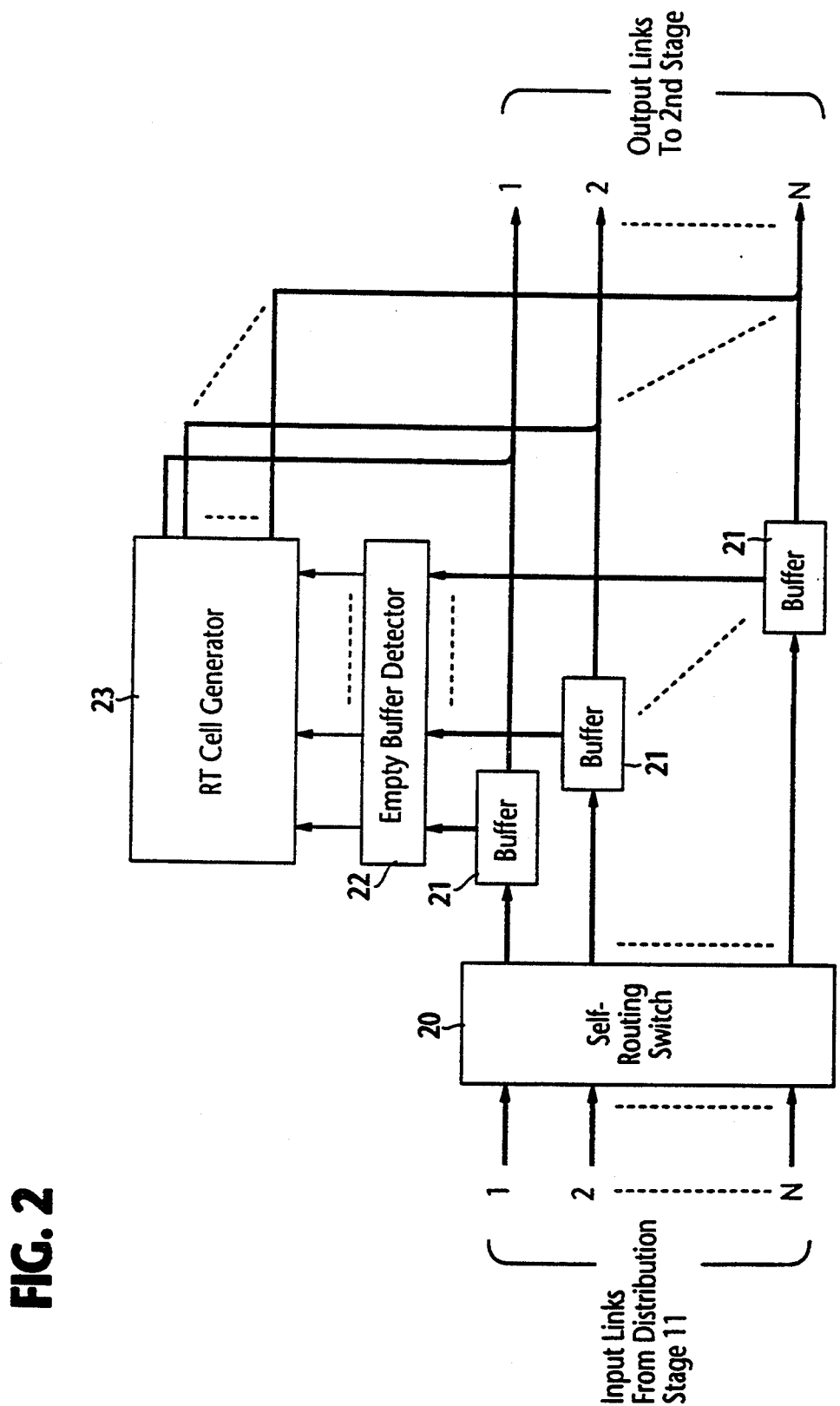
FIG. 2 is a block diagram of a switching module of the first stage of the system according to a first embodiment of the present invention.
Figure 3:
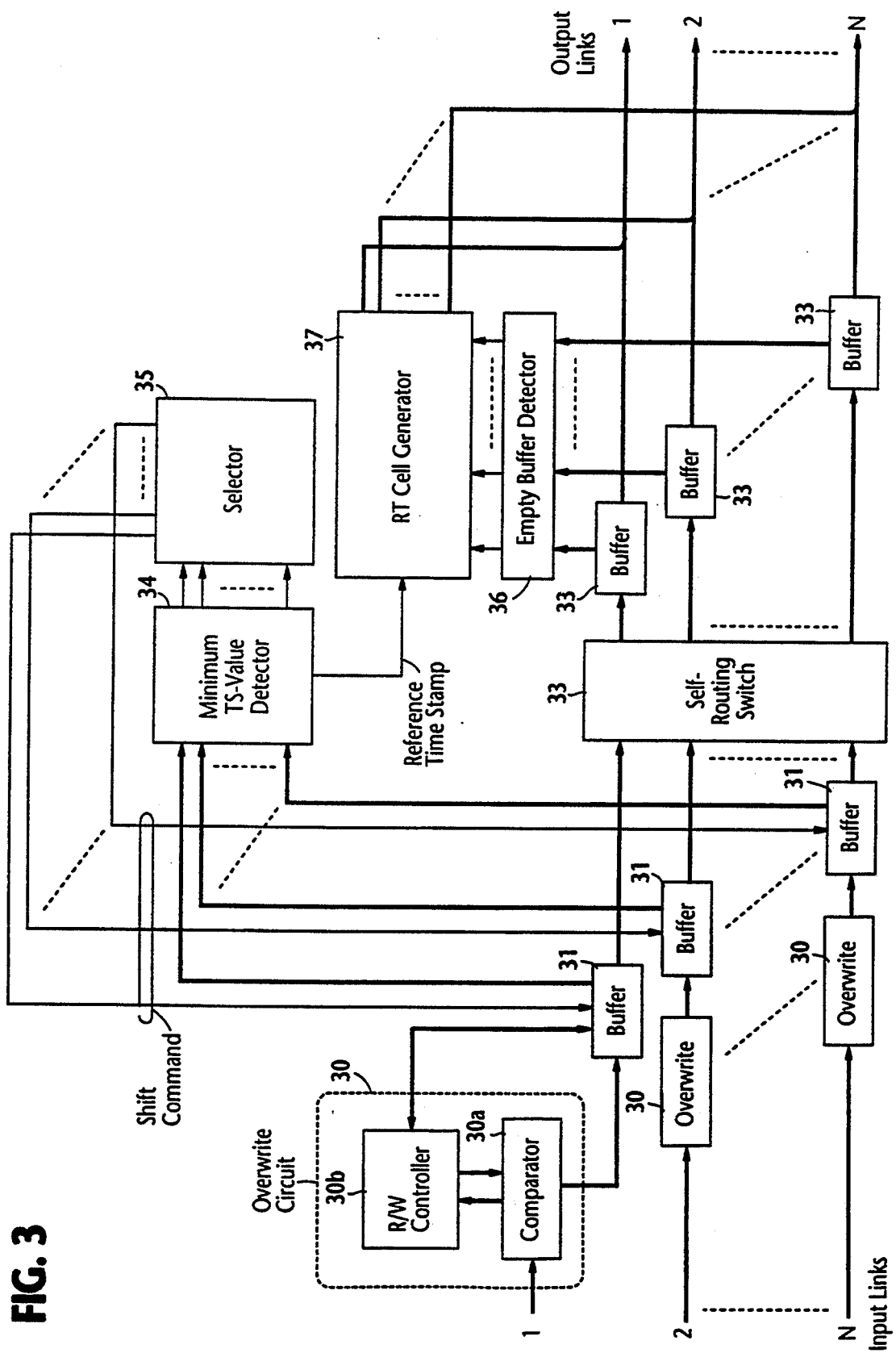
FIG. 3 is a block diagram of a switching module of the second stage of the system according to the first embodiment of the present invention.

According to a first embodiment of the present invention, the switching modules 15, 16 and 17 are respectively shown in detail in FIGS. 2, 3 and 4. In this embodiment, all switching modules of the system are of an input-output buffer configuration.

In FIG. 2, each of the first-stage N×N switching modules 15 comprises a self-routing switch 20 to which the input links 1 through N of the switching module are connected, for routing time-stamped ATM cells from the distribution stage 11 to desired output FIFO (first-in-first-out) buffers 21 according to the destination addresses contained in their cell headers. The self-routing switch 20 may be implemented with a time-division bus onto incoming cells are time-division multiplexed and an array of address filters connected to the bus for allowing cells on the bus to be passed through to a desired output buffer 21 if there is a match between the address contained in the cells and the address of the filter. Alternatively, the self-routing switch may be realized with a Butcher-Banyan network.

The output buffers 21 are connected through the output links numbered 1 through N of the switching module to the input links of the second stage 13. Since all incoming cells at the input ports of the system are sequentially time stamped, cell sequence integrity is kept in each output buffer 21, so that all cells are simply stored in each output buffer and then delivered to the second stage in proper sequence.

An empty buffer detector 22 is connected to the output buffers 21 to determine the identity of an empty output buffer and informs this identity to a reference time stamp (RT) cell generator 23. The RT cell generator 23 produces an idle cell containing in its header a time stamp indicating the current time, or time of day and supplies it as an RT cell to the output link that corresponds to the identified empty output buffer to prevent "no cell condition".

The second-stage N×N switching modules 16 are shown in FIG. 3. Each switching module 16 comprises overwrite circuits 30 connected respectively to the input links 1 through N of the switching module to receive time-stamped cells from the first switching stage 12. Overwrite circuits 30 are connected respectively to corresponding input FIFO buffers 31 whose outputs are connected to a self-routing switch 33.

Each overwrite circuit 30 comprises a comparator 30a and a read/write controller 30b connected to the associated input buffer 31 for reading the contents of a latest cell queued in the associated input buffer 31. Each incoming cell from the previous stage is fed into the comparator 30a where it is temporarily latched and the contents of its header are compared with the contents of the header of the cell read into the read/write controller 30b. Only if these cells are determined by the comparator 30a to be both idle cells, the later of these cells is applied from comparator 30a to read/write controller 30b and fed into the position of the buffer 31 where the earlier idle cell is stored so that its contents are overwritten with the time stamp of the later idle cell. Otherwise, the later-arrival cell, either idle or data, is supplied from the comparator 30a to the buffer 31 to be simply put in a queue following the previous cell. In this way, successive idle cells are not queued up in the input buffers 31.

The time-stamped cells from the first stage 12 queue up in the input buffers 31. When each input buffer receives at least one cell, the time stamp value of this cell is compared with the time stamp values of all other cells. To this end, a minimum time-stamp (TS) value detector 34 is connected to all input buffers 31 to receive ATM cells that are stored in the foremost (earliest) locations of the input buffers 31 to examine their time stamp values and detects one or more cells having a minimum, or earliest time stamp value.

The identifiers of the cells having the minimum time stamp values are supplied to a selector 35 where one of the cell identifiers is selected and a shift command is supplied to the buffer 31 where the selected cell is stored. In this way, the cell with the earliest time stamp value is read out of an input buffer 31 and launched into a self-routing switch 32. This process is repeated N times within a cell transfer time. In this way, cells arriving from different switching modules 15 at the same input buffer 31 are delivered in proper sequence as will be described in detail later. The cells launched into the self-routing switch 32 are routed according to their destination addresses to a desired one of output buffers 33 in much the same way as in the first switching stage 12.

The minimum time stamp value so detected by minimum TS-value detector 34 is applied as a reference time stamp to an RT cell generator 37, which is connected to an empty buffer detector 36 identical to the detector 22 of the first switching stage to inform the identity of an empty output buffer 33 to the RT cell generator 37. When an empty output buffer exists, the RT cell generator 37 generates an idle RT cell having the minimum time stamp value detected by the minimum TS-value detector 34. RT cell generator 37 supplies the RT cell to one of the output links of the switching module 16 that is connected to the empty output buffer. This RT cell will be used by the third stage as a reference (latest) time stamp value. However, the idle cells are ignored by the self-routing switch 32 as they contains no address information, and thus simply discarded by the switch 32.

In FIG. 4, the third-stage switching modules 17 are shown. It is seen that each switching module 17 is similar to the second-stage switching module 16. Switching module 17 differs from the module 16 in that the empty buffer detector 36 and RT cell generator 37 of FIG. 3 are dispensed with because there is no need to fill in idle cells where there is no cell.

The operation of the cell sequence control of the switching modules 16 and 17 will be better understood with a description given below with reference to FIGS. 5A and 5B.

Figure 5A:
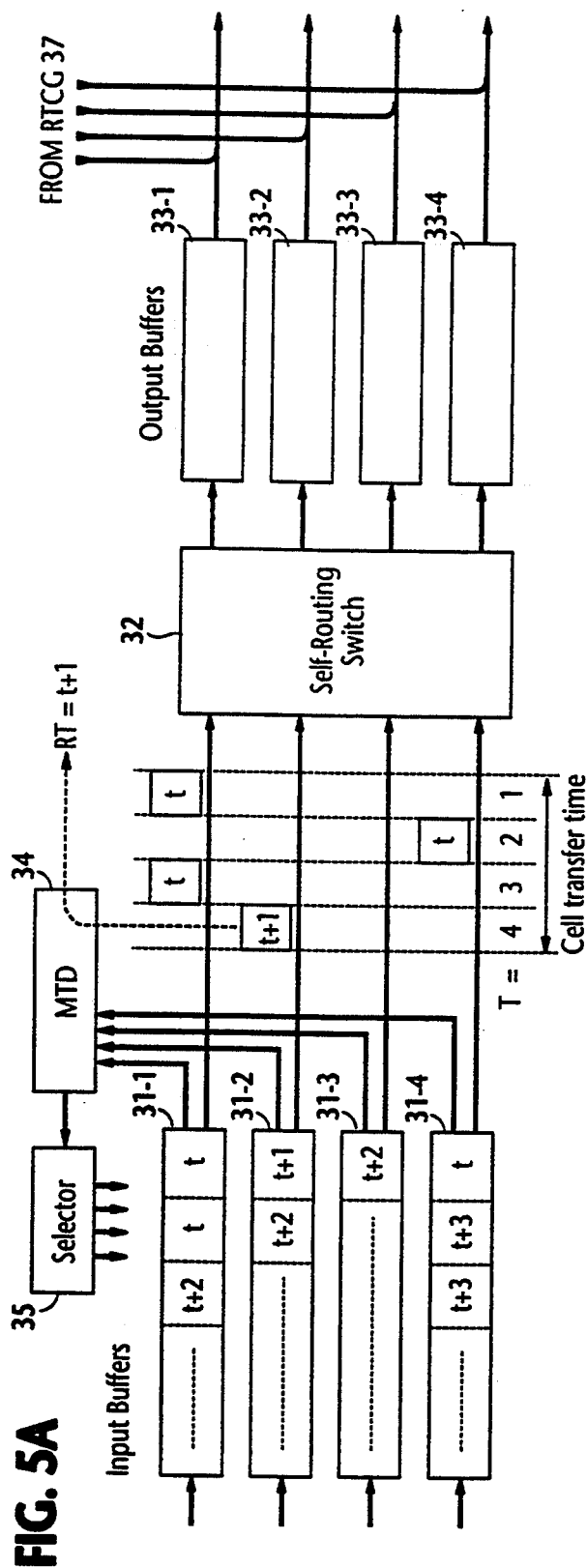
FIGS. 5A and 5B are schematic illustrations useful for describing the cell sequencing operation of the switching modules of the second and third stages.

In FIG. 5A, the switching module 16 is shown as comprising a 4×4 configuration. The input buffers 31-1 through 31-4 contain ATM data cells with their headers having time stamp values TS=t, t+1, t+2 and t, respectively, in their foremost ends. During the first time slot T=1, one of the input buffers 31-1 and 31-4 each containing a cell of the earliest arrival, i.e., TS=t, is selected by selector 35. In the illustrated example, input buffer 31-1 is selected and the earliest data cell therein is launched into the self-routing switch 32. During the second time slot T=2, input buffer 31-4 is selected and the earliest data cell therein is launched into the self-routing switch 32. During the third time slot T=3, data cell in the input buffer 31-1 with time stamp TS=t is launched into the switch 32, followed by the launching of data cell with TS=t+1 from the input buffer 31-2 during the fourth time slot T=4.

Figure 5B:
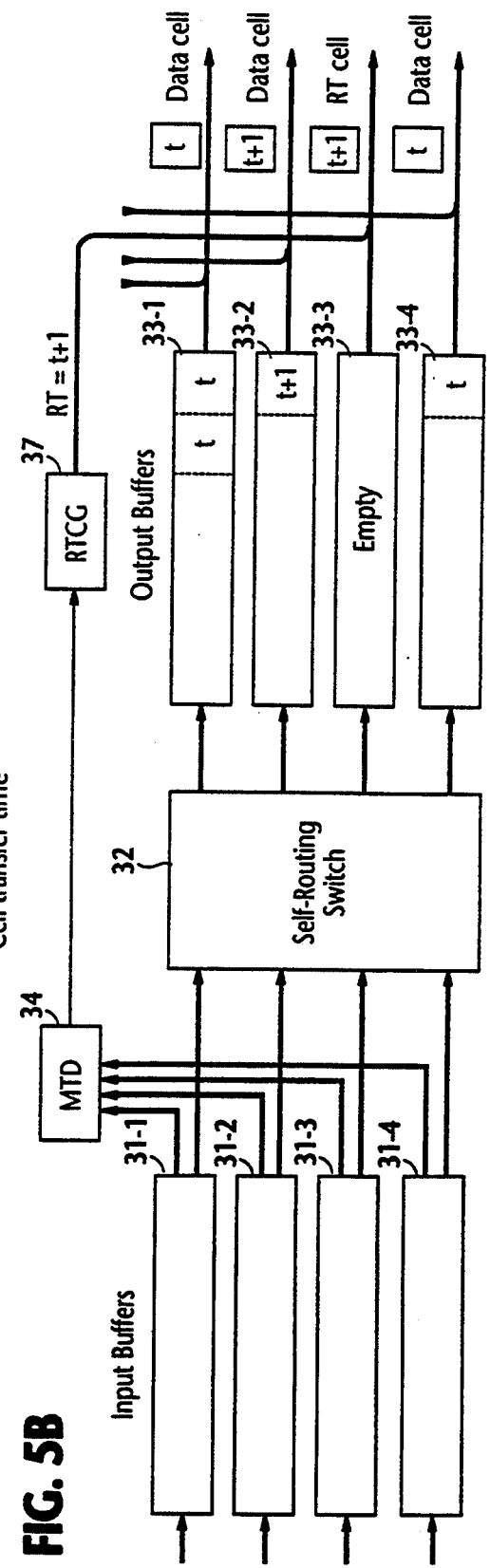

The cells launched into the self-routing switch 32 are routed to output buffers 33-1-33-4 according to the destination addresses contained in their respective headers as shown in FIG. 5B. Since the output buffer 33-3 is empty during time slot T=4, an RT cell containing RT=t+1 is generated by the RT cell generator 37 and supplied to the output link of the output buffer 33-3 as a latest cell. It is seen that during that time slot, data cells with time stamps "t" and "t+1", an idle cell with time stamp "t+1" and a data cell with time stamp "t" are transmitted from the output buffers 33-1, 33-2, 33-3 and 33-4, respectively. In this manner, cell sequence integrity is therefore kept in the switching module. Additionally, none of the switching modules of the second and third stages will become empty with the result that the total amount of delay can be reduced. The reduction of delay time allows reduction in buffer occupancy time of cells. Thus, cell loss probability is reduced and high throughput can be realized.

Figure 6:
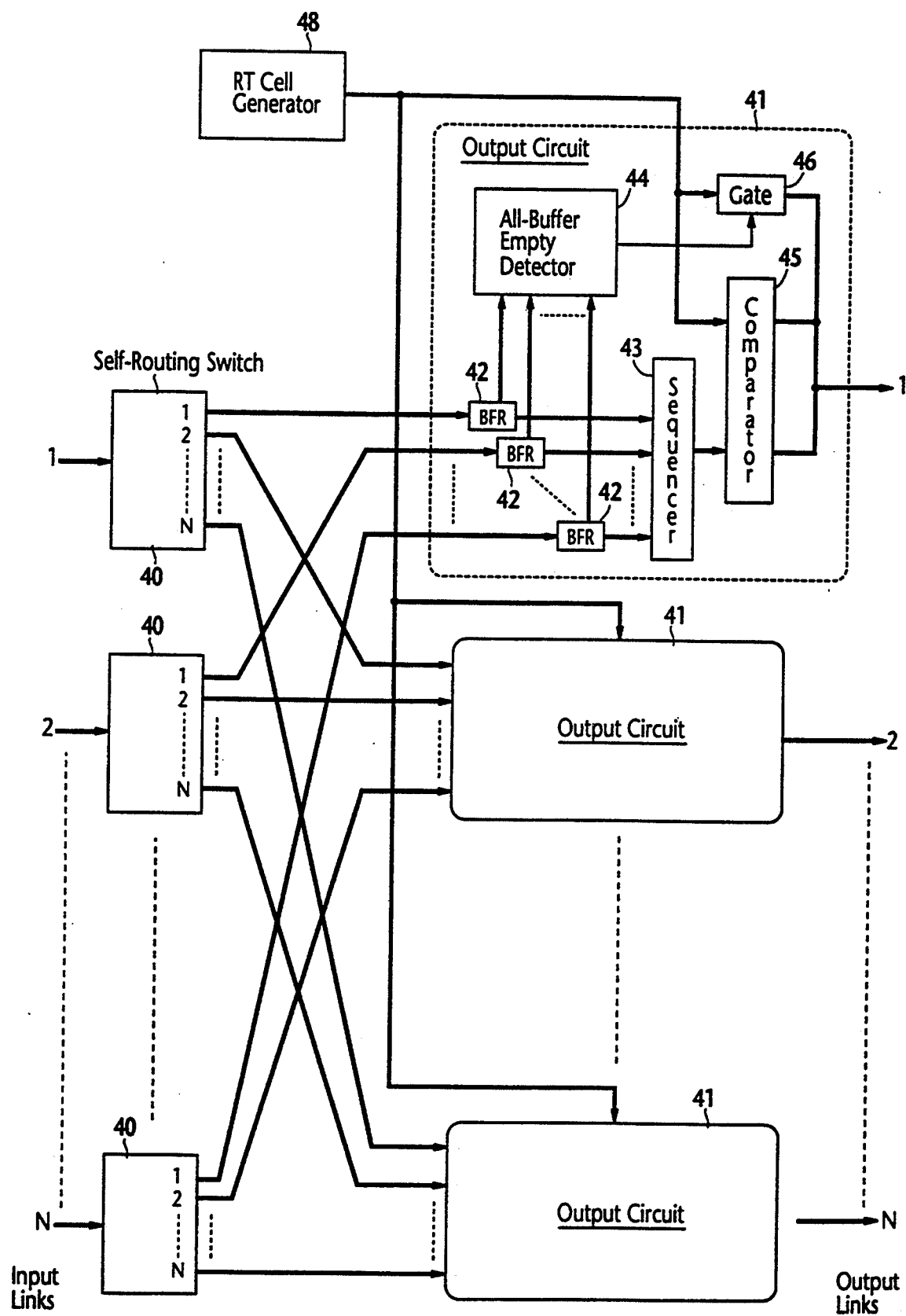
FIG. 6 is a block diagram of a switching module of the first stage of the system according to a second embodiment of the present invention.
Figure 7:
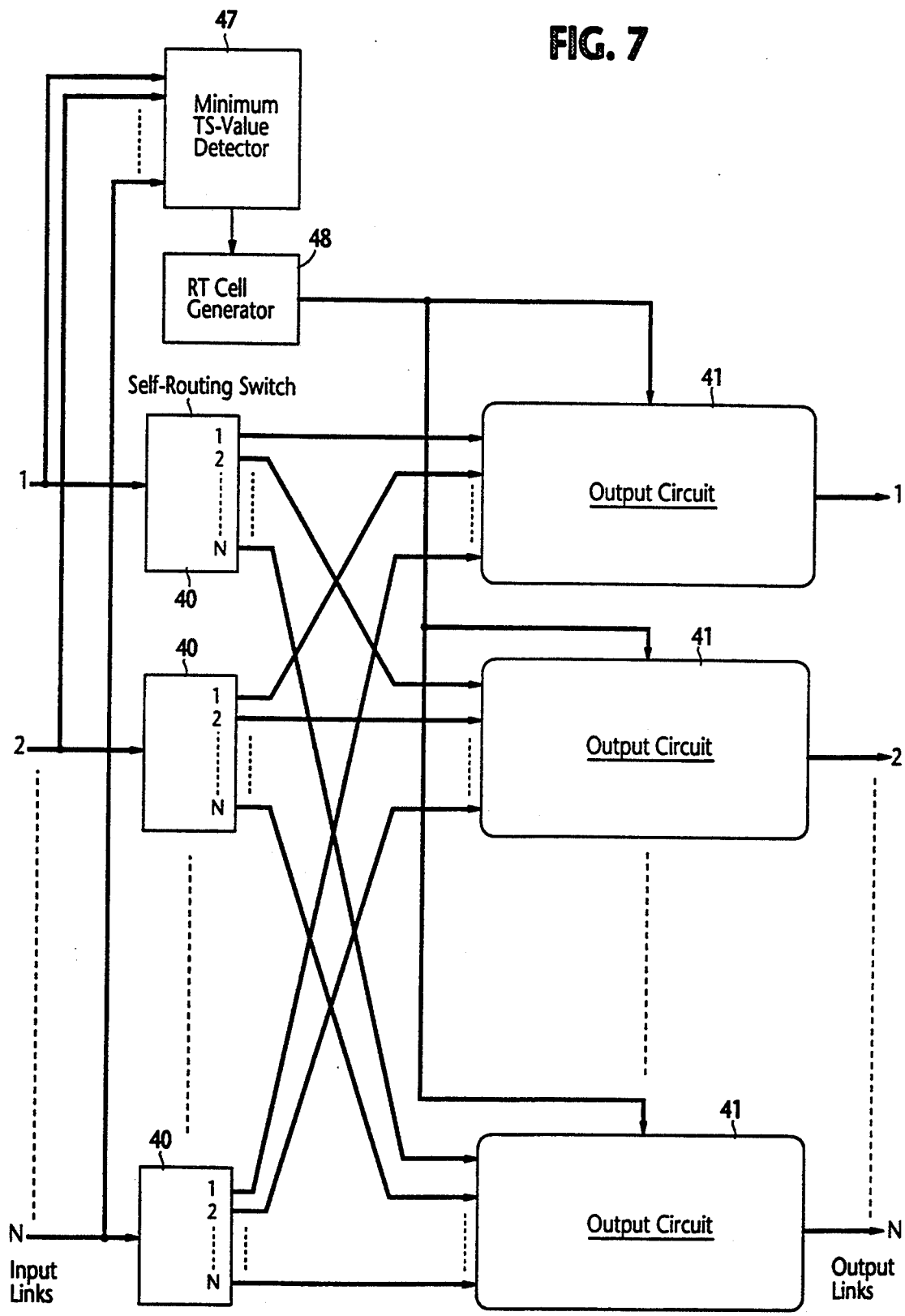
FIG. 7 is a block diagram of a switching module of the second stage of the system according to the second embodiment of the present invention.
Figure 8:
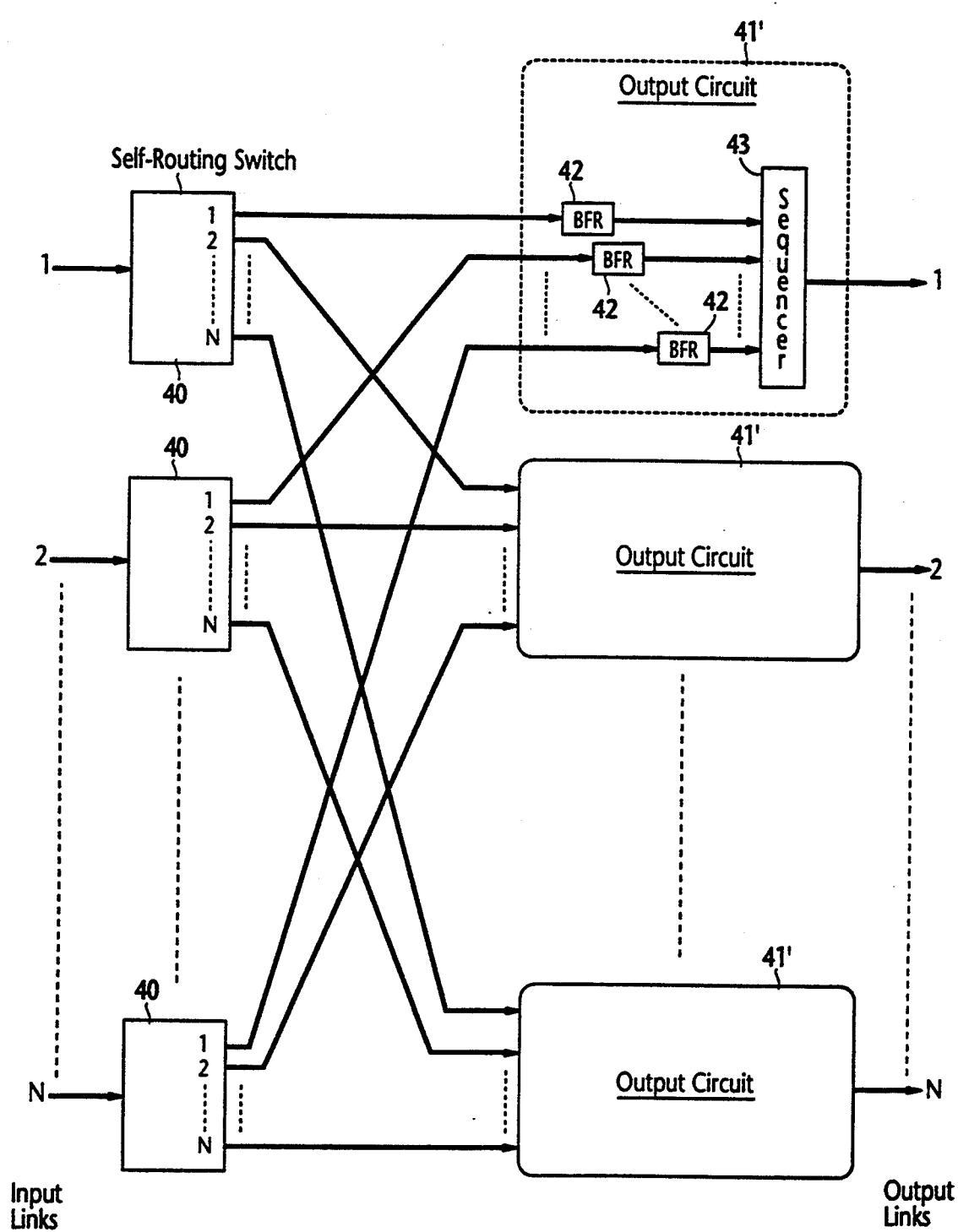
FIG. 8 is a block diagram of a switching module of the third stage of the system according to the second embodiment of the present invention.

FIGS. 6, 7 and 8 are block diagrams of first-, second-, and third-stage switching modules 15, 16 and 17, respectively, of a second embodiment of the present invention in which like numerals are used to indicate like elements. In this embodiment, all buffers of the system are interconnected in what is known as a "crosspoint" configuration.

In FIG. 6, the first-stage switching module 15 of the second embodiment comprises N self-routing switches 40 each having a single inlet connected to a corresponding input link of the switching module and N outlets. All incoming cells are self-routed by the switches 40 to one of their outlets according to the cell-header destination addresses. N output circuits 41 of identical configuration are provided corresponding respectively to output links 1 through N of the first-stage switching module. Each output circuit 41 comprises N first-in-first-out buffers 42 to which respective outputs of self-routing switches 40 are connected. The outputs of buffers 40 are connected to a sequencer 43 which ensures cell sequence integrity by arranging all incoming cells according to their time stamps. The output of the sequencer 43 is connected to one input of a comparator 45 to which an idle RT cell is also supplied from an RT cell generator 48. In a manner similar to the RT cell of FIG. 2, the RT cell supplied from RT cell generator 48 contains a time stamp indicating the current time. Buffers 42 are also connected to an all-buffer empty detector 44 to produce an output when all of these buffers are empty.

Comparator 45 compares the time stamp value of cells from sequencer 43 and the reference time stamp value of cells from RT cell generator 48. If the time stamp value of the former is equal to or smaller than the reference time stamp value, comparator 45 selects the cell from sequencer 43 and delivers it to the output link. If the timer stamp of the sequencer output is greater than the reference time stamp, comparator 45 selects the RT cell for delivery.

It is seen that even if one of the buffers 42 becomes empty, comparator 45 maintains cell sequence integrity, minimizing the total delay time of the switching module.

A gate 46 is also provided to respond to the output of all-buffer empty detector 44 for passing the RT cell to the output link of the switching module when all buffers 42 are empty. Under such all-empty conditions, the RT cells delivered from a switching stage are used by the second switching stage to update its reference time stamp value.

In FIG. 7, the second switching module 16 of the second embodiment is generally similar to that of FIG. 6 with the exception that it additionally includes a minimum time-stamp value detector 47. This detector is connected to all input links of the switching module to detect a cell having a minimum time stamp value and informs the detected value to the RT cell generator 48 to cause it to generate an idle RT cell having the minimum time stamp value. Incoming time-stamped data cells from the first switching stage are routed by the switches 40, while discarding the incoming RT cells. In each output circuit 41, the minimum time stamp value of the RT cell is used as a reference, instead of the RT cell containing the current time, in order to maintain cell sequence integrity.

In FIG. 8, the third-stage switching module 17 is of a simplified configuration. As no idle cells generation is required, this switching module includes only N self-routing switches 40 connected to the input links of the switching module for routing the cells to N output circuits 41' which are connected to output ports of the switching system. Each output circuit 41' comprises N buffers 42 connected to respective outputs of the routing switches and a sequencer 43 for sequencing the cells from these buffers onto the corresponding output link (port) according to their time stamp values.

What is claimed is:

1. A multi-stage switching system having a plurality of input ports and a plurality of output ports, the system comprising:

a pre-switching stage connected to said input ports for receiving incoming cells therefrom, attaching a time stamp to each of said cells indicating the time of arrival of the cell at said input ports, and transferring the cell to one of a plurality of output terminals;

a first switching stage comprising a plurality of switching modules each having a plurality of input links connected to the output terminals of said pre-switching stage, and a plurality of output links, each of the switching modules of the first switching stage comprising;

a plurality of output buffers connected respectively to said output links of the switching module;

a self-routing switch for routing a cell from any of said input links of the switching module to any one of said output buffers according to a destination address contained in the cell; and means for identifying an empty one of said output buffers, producing an idle cell having a time stamp indicating a current time, and supplying the idle cell to one of said output links corresponding to the identified output buffer, a second switching stage comprising a plurality of switching modules each having a plurality of input links connected to respective output links of the first switching stage, and a plurality of output links; and a third switching stage comprising a plurality of switching modules each having a plurality of input links connected to respective output links of the second switching stage, and a plurality of output links connected to the output ports of said switching system, each of the switching modules of said second and third switching stages comprising:

a plurality of input buffers connected respectively to the input links of the switching module for storing cells from a preceding stage;

a plurality of output buffers connected respectively to the output links of the switching module;

a self-routing switch for routing a cell from any of said input buffers to any of said output buffers according to a destination address contained in the cell; and detector means connected to the input links of the switching module for sequentially detecting a cell having a minimum time stamp value and sequentially causing one of the input buffers to launch the detected cell into said self-routing switch, each of the switching modules of the second switching stage further comprising means for identifying an empty one of the output buffers of the switching module, producing an idle cell having the minimum time stamp value detected by the detector means of the switching module, and supplying the idle cell to one of the output links of the switching module corresponding to the identified output buffer, wherein each switching module of said second and third switching stages further comprises means for overwriting an idle cell in each of the input buffers of the switching module with an idle cell of later arrival.

2. A multi-stage switching system having a plurality of input ports and a plurality of output ports, the system comprising:

a pre-switching stage connected to said input ports for receiving incoming cells therefrom, attaching a time stamp to each of said cell indicating the time of arrival of the cell at said input ports, and transferring the cell to one of a plurality of output terminals;

a first switching stage comprising a plurality of switching modules each having a plurality of input links connected to the output terminals of said pre-switching stage, and a plurality of output links, each of the switching modules of the first switching stage comprising means for generating an idle cell containing a time stamp indicating a current time;

a second switching stage comprising a plurality of switching modules each having a plurality of input links connected to respective output links of the first switching stage, and a plurality of output links, each of the switching modules of said second switching stage comprising means connected to the input links of the switching module for detecting a cell having a minimum time stamp value, and means for generating an idle cell containing said minimum time stamp; and a third switching stage comprising a plurality of switching modules each having a plurality of input links connected to respective output links of the second switching stage, and a plurality of output links connected to the output ports of said switching system, each of the switching modules of said first, second and third switching stages comprising a plurality of self-routing switches corresponding respectively to the input links of the switching module, each of said self-routing switches having an inlet connected to the corresponding input link and a plurality of outlets for routing a cell from the input link to any of said outlets according to a destination address contained in the cell, each of the switching modules of said first and second switching stages comprising a plurality of output circuits corresponding respectively to the output links of the switching module, each of the output circuits comprising a plurality of buffers connected to respective outlets of the self-routing switches of the switching module, means for sequencing cells stored in said buffers according to the time stamps of the cells, and means for comparing a cell from said sequencing means and an idle cell from said idle cell generating means of the switching module and delivering one of the cells to the corresponding output link of the output circuit of the switching module depending on the time stamps of said cells, each of the switching modules of the third switching stage comprising a plurality of output circuits corresponding respectively to the output links of the switching module, each of the output circuits comprising a plurality of buffers connected to respective outputs of the self-routing switches of the switching module and means for delivering cells stored in said buffers to the corresponding output link of the output circuit according to the time stamps of the cells, wherein each of the output circuits of each switching module of said first and second switching stages comprises means for detecting when all of said buffers of the switching module are empty and producing an all-empty signal, and means for delivering an idle cell from the idle cell generating means of the switching module to the output link of the output circuit.

* * * * *